United States Patent
Soto Matamala et al.

(10) Patent No.: US 9,195,721 B2
(45) Date of Patent: Nov. 24, 2015

(54) MOBILE DEVICE WITH LOCALIZED APP RECOMMENDATIONS

(71) Applicant: Apple Inc., Cupertino, CA (US)

(72) Inventors: Leonardo A. Soto Matamala, Saratoga, CA (US); Ronald K. Huang, San Jose, CA (US); Scott Herz, Cupertino, CA (US); Tad Shimada, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 269 days.

(21) Appl. No.: 13/843,291

(22) Filed: Mar. 15, 2013

(65) Prior Publication Data

US 2013/0339345 A1    Dec. 19, 2013

Related U.S. Application Data

(60) Provisional application No. 61/655,427, filed on Jun. 4, 2012, provisional application No. 61/657,403, filed on Jun. 8, 2012, provisional application No. 61/699,705, filed on Sep. 11, 2012.

(51) Int. Cl.
*G06F 7/00* (2006.01)
*G06F 17/30* (2006.01)
(Continued)

(52) U.S. Cl.
CPC ...... *G06F 17/30554* (2013.01); *G06F 17/3087* (2013.01); *H04W 4/02* (2013.01); *H04W 8/18* (2013.01)

(58) Field of Classification Search
CPC .......... G06F 17/30864; G06F 17/3053; G06F 17/30867; G06F 17/30554; G06F 17/30595
USPC .......................................................... 707/727
See application file for complete search history.

(56) References Cited

U.S. PATENT DOCUMENTS

| 2007/0016373 | A1 | 1/2007 | Hunter et al. |
| 2008/0167078 | A1 | 7/2008 | Eibye |
| 2009/0060352 | A1 | 3/2009 | Distante et al. |

(Continued)

FOREIGN PATENT DOCUMENTS

EP    2 523 436 A1    11/2012

OTHER PUBLICATIONS

U.S. Appl. No. 13/842,724, filed Mar. 15, 2013, for Leonardo A. Soto Matamala et al., entitled "App Recommendation Using Crowd-Sourced Localized App Usage Data," (Copy Not Attached).

(Continued)

*Primary Examiner* — Truong Vo
(74) *Attorney, Agent, or Firm* — Kilpatrick Townsend & Stockton LLP

(57) ABSTRACT

Mobile devices can provide app recommendations that are relevant to a location of interest. A localized app recommendation can be triggered (e.g., by a mobile device coming within a threshold distance of an application hotspot or some other user action). A location of interest can be determined. The location of interest can be the current location of the mobile device or another location (e.g., the destination in a mapping app). Using the location of interest, a localized application ranking database with app hotspot data can be queried with location data representing the location of interest. App recommendations can be received and displayed on the mobile device. Icons for apps that are relevant to the location of interest can be visually distinguished from other apps.

27 Claims, 9 Drawing Sheets

(51) Int. Cl.
*H04W 4/02* (2009.01)
*H04W 8/18* (2009.01)

(56) References Cited

U.S. PATENT DOCUMENTS

| | | |
|---|---|---|
| 2009/0215497 A1 | 8/2009 | Louch |
| 2010/0069035 A1 | 3/2010 | Johnson |
| 2010/0331016 A1 | 12/2010 | Dutton et al. |
| 2011/0093492 A1 | 4/2011 | Sull et al. |
| 2011/0105150 A1 | 5/2011 | Moon et al. |
| 2011/0179449 A1 | 7/2011 | Ganesan et al. |
| 2011/0307354 A1* | 12/2011 | Erman et al. .......... 705/27.1 |
| 2011/0307478 A1 | 12/2011 | Pinckney et al. |
| 2011/0320307 A1 | 12/2011 | Mehta et al. |
| 2012/0021774 A1 | 1/2012 | Mehta et al. |
| 2012/0036507 A1 | 2/2012 | Jonnala et al. |
| 2012/0042036 A1 | 2/2012 | Lau et al. |
| 2012/0095979 A1 | 4/2012 | Aftab et al. |
| 2012/0101976 A1 | 4/2012 | Flinn et al. |
| 2012/0110174 A1 | 5/2012 | Wootton et al. |
| 2012/0134548 A1 | 5/2012 | Rhoads et al. |
| 2012/0142369 A1 | 6/2012 | Hodges |
| 2012/0258696 A1 | 10/2012 | Nam et al. |
| 2012/0290434 A1 | 11/2012 | Moritz et al. |
| 2012/0316955 A1 | 12/2012 | Panguluri et al. |

OTHER PUBLICATIONS

International Search Report and Written Opinion mailed Mar. 21, 2014 in PCT/US2013/042483, 20 pages.
International Search Report and Written Opinion mailed Dec. 4, 2014 in PCT/US13/42484, 9 pages.

* cited by examiner

This application is a non-provisional application of, and claims priority to U.S. Provisional Appl. No. 61/655,427 (filed on Jun. 4, 2012), U.S. Provisional Appl. No. 61/657,403 (filed on Jun. 8, 2012), and U.S. Provisional Appl. No. 61/699,705 (filed on Sep. 11, 2012), the contents of which are incorporated by reference for all purposes.

BACKGROUND

The present disclosure generally relates to a mobile device with localized app recommendations, and more specifically to using crowd-sourced app usage data to provide relevant app recommendations to users of mobile devices based on location.

Mobile computing devices, such as smart phones, tablet computers, media players, portable computers, and the like, have become ubiquitous. People are ever more reliant on mobile devices for their day-to-day activities. Mobile devices can run software applications, or apps, designed to help users perform specific tasks. Users have a vast set of apps to choose from. For example, there are hundreds of thousands of apps available in the App Store$^{SM}$. Apps have been downloaded and used by millions. The App Store$^{SM}$ has provided billions of apps for download. Given the large number of apps available, it can be difficult for users to find the most useful apps.

Embodiments of the invention address this and other problems both individually and collectively.

BRIEF SUMMARY

In some embodiments, mobile devices can provide app recommendations that are relevant to a location of interest. A localized app recommendation can be triggered (e.g., by a mobile device coming within a threshold distance of an application hotspot or some other user action). A location of interest can be determined. The location of interest can be the current location of the mobile device or another location (e.g., the destination in a mapping app). Using the location of interest, a localized application ranking databases with app hotspot and data app ranking/scoring information can be queried with location data representing the location of interest. App recommendations can be received and displayed on the mobile device. For example, icons for apps that are relevant to the location of interest can be visually distinguished from other apps. These and other embodiments of the present invention are described further below.

DETAILED DESCRIPTION

Figure 1:
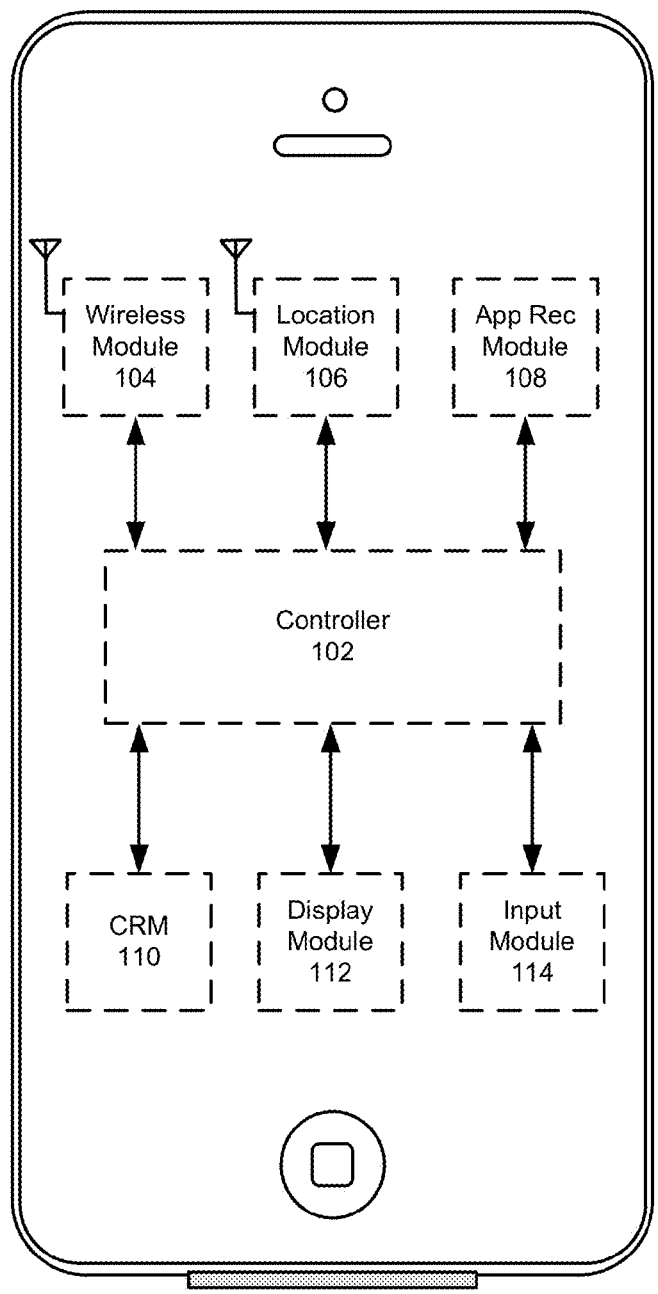
FIG. 1 is a block diagram of a mobile device according to an embodiment of the present invention.

Given the vast set of apps that are available, it would be beneficial to provide mechanisms for users to more easily discover apps that are relevant and filter apps that are less relevant. Relevance can be defined with respect to a particular task or goal, or more generally to a given activity. App relevance can be defined as follows: an App Xi is relevant to a given activity Aj if Xi supports conducting activity Aj in a way that makes performing Aj possible, or faster, or easier, or more enjoyable, or it provides in a different way an improved user experience when performing Aj. Therefore, it would be beneficial to enable a user to discover apps that are relevant for the activities that the user needs to perform or is interested in.

Often there is a link between spatio-temporal localization and relevance. That is, humans often exhibit a high degree of temporal and spatial regularity. For example, individuals are likely to visit a few highly frequented locations. Individuals may return to highly frequented locations because of the activities that are performed at the locations and/or the tasks being accomplished at the locations. Similarly, the time of day locations are frequented can relate to the activities that are performed at the locations and/or the tasks being accomplished at the locations. For example, restaurants are often frequented at meal times; gyms are visited to work out; offices are for working; libraries are for studying or research; etc. Based on these assumptions, app usage can be related to the activities that can be performed at a given location. Furthermore, by analyzing localized app usage, space-time localization of human activities (some areas may exhibit different popular activities at different times of the day) can be identified. Therefore, some embodiments of the present invention enable the user to find apps that are relevant to specific locations.

App usage data, for example uses or downloads of an app, can be tagged with location and/or time information and crowd-sourced from a plurality of mobile devices. A localized app recommendation engine may identify apps that are statistically relevant to particular locations (e.g., locations where the apps have "hotspots" for usage and are more relevant to the particular location than "peer" apps). Various methods, systems, and devices for identifying applications that exhibit localization characteristics (e.g., apps that have "hotspot" locations) are described in U.S. patent application Ser. No. 13/842,724, filed concurrently with the present application, the disclosure of which is incorporated by reference in its entirety for all purposes. Apps may be manually designated as particularly relevant to certain locations by app developers, application store operators, or the like.

Once app hotspots have been identified, app recommendations can be provided to users of mobile devices based on the current location of the mobile device or another specified location. App recommendations can be triggered in a number of ways, and once triggered can be presented to the user in various ways. For example, a user could enter a predetermined radius of an identified hotspot for a particular application and a notification for that application can automatically be displayed on the user's mobile device. In another example, the user may request apps, overtly or otherwise, that are relevant to a particular location (e.g., apps that are relevant to the final destination specified in a maps app, apps that are relevant to the current location, etc.).

In one example, the "Ski Mountain Guide" app may be presented to the user whenever the user is near the ski resort named "Ski Mountain" (e.g., an alert or notification). The American Museum of Natural History app may be presented when the user is in or near the museum. In another example, locally relevant applications may be presented in response to a search (e.g., search for "Paris" returns apps that are locally relevant to Paris). In another example, applications that are locally relevant to a particular area may be grouped together and categorized (e.g., a Paris application category, or more generally, Travel category in the App Store).

These and other embodiments will be described further below after example mobile devices and systems are described in the following section.

I. Mobile Device and System

FIG. 1 shows a high-level block diagram of a mobile device 101. It will be further appreciated that the device shown in FIG. 1 is illustrative and that variations and modifications are possible. Mobile device 101 can include a controller 102, a wireless module 104, a location module 106, app recommendation module 108, a computer-readable medium (CRM) 110, a display module 112, and an input module 114. Mobile device 101 can include additional modules. In some embodiments, mobile device 101 can be a sufficient size, dimension, and weight to enable the device to be easily moved by a user. For example, mobile device 101 can be pocket size.

Controller 102, which can be implemented as one or more integrated circuits, can control and manage the overall operation of mobile device 101. For example, controller 102 can perform various tasks, such as retrieving various assets that can be stored in CRM 110, accessing the functionalities of various modules (e.g., interacting with other Bluetooth-enabled devices via Bluetooth module), executing various software programs (e.g., operating systems and applications) residing on CRM 110, and so on. In some embodiments, controller 102 can include one or more processors (e.g., microprocessors or microcontrollers) configured to execute machine-readable instructions. For example, controller 102 can include a single chip applications processor. Controller 102 can further be connected to CRM 110 in any suitable manner.

Wireless module 104 can include any suitable wireless communication technology. For example, wireless module 104 could include a Bluetooth module, a radio frequency (RF) module, a WiFi module, and/or the like. The Bluetooth module can include any suitable combinations of hardware for performing wireless communications with other Bluetooth-enabled devices and allows an RF signal to be exchanged between controller 102 and other Bluetooth-enabled devices. In some embodiments, a Bluetooth module can perform such wireless communications according to Bluetooth Basic Rate/Enhanced Data Rate (BR/EDR) and/or Bluetooth Low Energy (LE) standards. The Bluetooth protocol, in general, enables point-to-point wireless communications between multiple devices over short distances (e.g., 30 meters). Bluetooth has gained widespread popularity since its introduction and is currently used in a range of different devices. In order to allow Bluetooth to be used in a greater variety of applications, a low energy variant of the technology was introduced in the Bluetooth Core Specification, Version 4.0. Bluetooth Low Energy (LE), in general, enables devices to wirelessly communicate while drawing low amounts of power. Devices using Bluetooth LE can often operate for more than a year without requiring their batteries to be recharged.

For example, a Bluetooth module can include suitable hardware for performing device discovery, connection establishment, and communication based on only Bluetooth LE (e.g., single mode operation). As another example, a Bluetooth module can include suitable hardware for device discovery, connection establishment, and communication based on both Bluetooth BR/EDR and Bluetooth LE (e.g., dual mode operation). As still another example, a Bluetooth module can include suitable hardware for device discovery, connection establishment, and communication based only on Bluetooth BR/EDR.

An RF module can include any suitable combinations of hardware for performing wireless communications with wireless voice and/or data networks. For example, an RF module can include an RF transceiver that enables a user of mobile device 101 to place telephone calls over a wireless voice network.

A WiFi module can include any suitable combinations of hardware for performing WiFi-based communications with other WiFi-enabled devices. For example, a WiFi module may be compatible with IEEE 802.11a, IEEE 802.11b, IEEE 802.11g and/or IEEE 802.11n.

Location module 106 can include any suitable location technology using one or more wireless signals to determine a current location. In some embodiments, location module 106 includes a global positioning system (GPS) module. In some embodiments, location module 106 includes one or more of the following: WiFi location module, cellular location module, crowd-sourced WiFi location module, time of flight calculations (ToF) location module, and the like.

App recommendation module 108 can include code that, when executed, determines or provides an app recommendation to the user based on a location. For example, the user can request app recommendations for a particular location. In another example, a notification regarding a locally relevant app could be provided based on the mobile device's current location. App rec module 108 can also perform device-side collection and aggregation of app usage data for crowd-sourcing.

CRM 110 can be implemented, e.g., using disk, flash memory, random access memory (RAM), hybrid types of memory, optical disc drives or any other storage medium that can store program code and/or data. CRM 110 can store software programs that are executable by controller 102, including operating systems, applications, and related program code (e.g., code for app rec module 108).

Software programs (also referred to as software or apps herein) can include any program executable by controller 102. In some embodiments, certain software programs can be installed on mobile device 101 by its manufacturer, while other software programs can be installed by a user. Examples of software programs can include operating systems, navigation or other maps applications, locator applications, productivity applications, video game applications, personal information management applications, applications for playing media assets and/or navigating a media asset database, applications for controlling a telephone interface to place and/or receive calls, and so on. Although not specifically shown, one or more application modules (or set of instructions) may be provided for launching and executing one or more applications, e.g., various software components stored in medium 110 to perform various functions for mobile device 101.

Display module 112 can be implemented using any suitable display technology, including a CRT display, an LCD display (e.g., touch screen), a plasma display, a direct-projection or rear-projection DLP, a microdisplay, and/or the like. In various embodiments, display module 112 can be used to visually display user interfaces, images, and/or the like.

Input module 114 can be implemented as a touch screen (e.g., LCD-based touch screen), a voice command system, a keyboard, a computer mouse, a trackball, a wireless remote, a button, and/or the like. Input module 114 can allow a user to provide inputs to invoke the functionality of controller 102. In some embodiments, input module 114 and display module 112 can be combined or integrated. For example, mobile device 101 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

Figure 2:
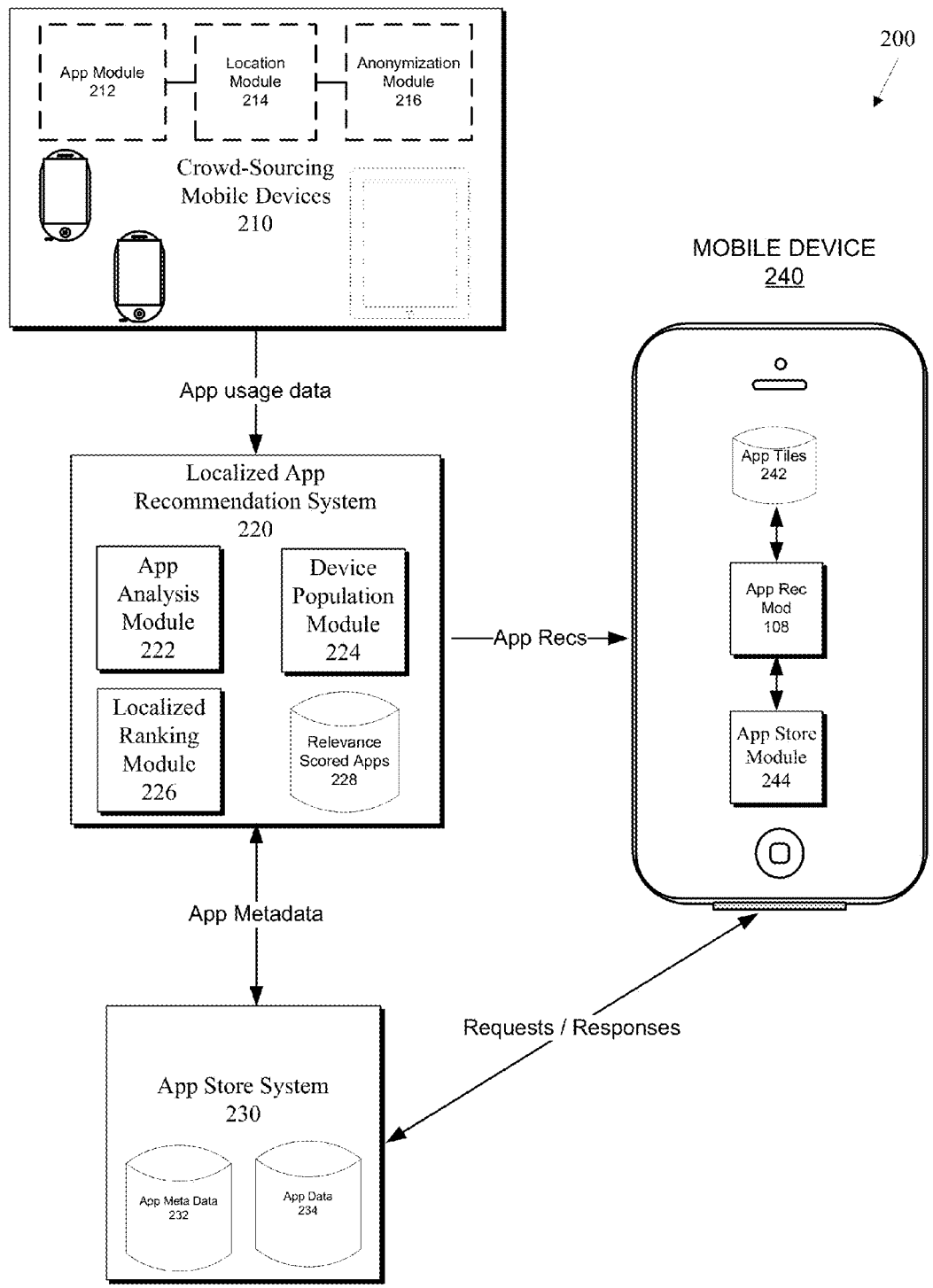
FIG. 2 shows a high-level block diagram of a system according to an embodiment of the present invention.

FIG. 2 shows a high-level block diagram of a system 200 for performing certain embodiments of the present invention. The system 200 comprises a plurality of crowd-sourcing mobile devices 210 for providing crowd-sourced app usage data, an app recommendation system 220, and an app store system 230.

Crowd-sourced location data can be anonymously crowd-sourced from the plurality of mobile devices 210. Devices may opt-in for this feature. Crowd-sourcing mobile devices 210 can include various hardware and software components, such as illustrated in FIG. 1, and/or an app module 212, location module 214, and anonymization module 216.

Mobile devices 210 can execute applications with one or more app modules 212, which can launch and execute various applications. Mobile devices 210 may tag location data to app usage. A location module 214 can determine a current location associated with the app event (e.g., launching the app) and tag the app event with the determined location. In one embodiment, a unique app identifier is assigned to an app. When that app is used, the location data is associated with the app identifier. For example, an application identifier (e.g., app bundle ID) may be associated with the best known current location. Privacy preserving rules (PPR) may be provided and only when privacy preserving rules are met is app usage data collected and submitted. An anonymization module 216 may be provided on the crowd-sourcing mobile devices to decimate data and/or ensure privacy preserving rules are satisfied. In one embodiment, location data for app usage and, optionally, time data may be anonymized on the device-side and submitted to the app recommendation system for further processing. Anonymization may occur on the server-side in addition to, or in lieu of, device-side anonymization.

Localized app recommendation system 220 may comprise an app analysis module 222, device population module 224, and a localized ranking module 226. The raw crowd-sourced data from the plurality of mobile devices 210 can be aggregated and the significant usage can be extracted by the recommendation system 220. Privacy may be preserved and relevant recommendations may be provided by a data processing pipeline that comprises: data decimation; estimation of the spatio or spatio-temporal distribution of usage for individual apps; detecting individual app usage hotspots; and combining the usage information of all the processed apps with metadata (category, user ratings, etc.) in order to generate a relevance-scored list of apps for every space-time bin with significant app usage. The app recommendation system may analyze aggregated data and identify statistical outliers to find apps especially relevant to a particular location. A database of relevance scored apps can be stored in relevance scored apps database 228. One example of an application that may be highly localized is the Apple Store application because it may be used more frequently at or near Apple retail stores. The app recommendation system may filter out apps that are common across many different locations. For example, a social networking app (such as Facebook) may have very weak localization, and therefore is not relevant to any particular location. Another possible example is the Find My iPhone application because the application is typically used when users cannot find their iPhone, rather than when a user is near a particular location.

App store system 230 may provide mechanisms for the user to discover locally relevant apps. App store system 230 can include a database 232 for storing metadata regarding apps available from the app store. App store system 230 can further include a database 234 of app data so that an app can be downloaded by a user.

App store system 230 can include an interface (not shown) for communications with a mobile device 240. This component can include mechanisms for presenting the user with locally relevant apps. Mechanisms for the user to discover locally relevant apps comprise: alerts and notifications, search tools, app categorization, application bundles, etc. In some embodiments, app recommendations are pre-chased to the mobile device, for example, from the localized app recommendation system 220. Mobile device 240 can include various hardware and software components, such as illustrated in FIG. 1, and/or an app tiles database 242, app recommendation module 108, and an app store module 244.

App tiles for a predetermined area proximate to a location can be pre-cached to mobile device 240. Pre-cached app tiles can be stored in app tiles database 242 on mobile device 240. In this manner, the more specific location recommendations can occur device-side (e.g., on the mobile device, without sending a location to the app store server in order to receive a recommendation). This can further privacy considerations and reduce battery and data consumption.

App recommendation module 108 can include code that, when executed, determines or provides an app recommendation to the user based on a location. For example, the user can request app recommendations for a particular location. In another example, a notification regarding a locally relevant app could be provided based on the mobile device's current location. App recommendation module 108 can interface with the app store module 244, which can provide a user interface for recommending apps in some embodiments.

Now that exemplary devices and systems have been described, we now turn to a high-level description of a method according to an embodiment of the present invention. The devices and systems described above can be used in implementing the following method.

II. Overview of Methods

One or more of the process blocks of the methods described herein may be optional and may be omitted. The sequence of one or more process blocks may be modified, and the process blocks may be performed in any suitable order. Some of the optional blocks and/or sequence modifications are specifically described herein for purposes of illustration; however, one having skill in the art will recognize that other modifications and omissions are contemplated within the scope of the disclosure.

Figures 3A, 3B:
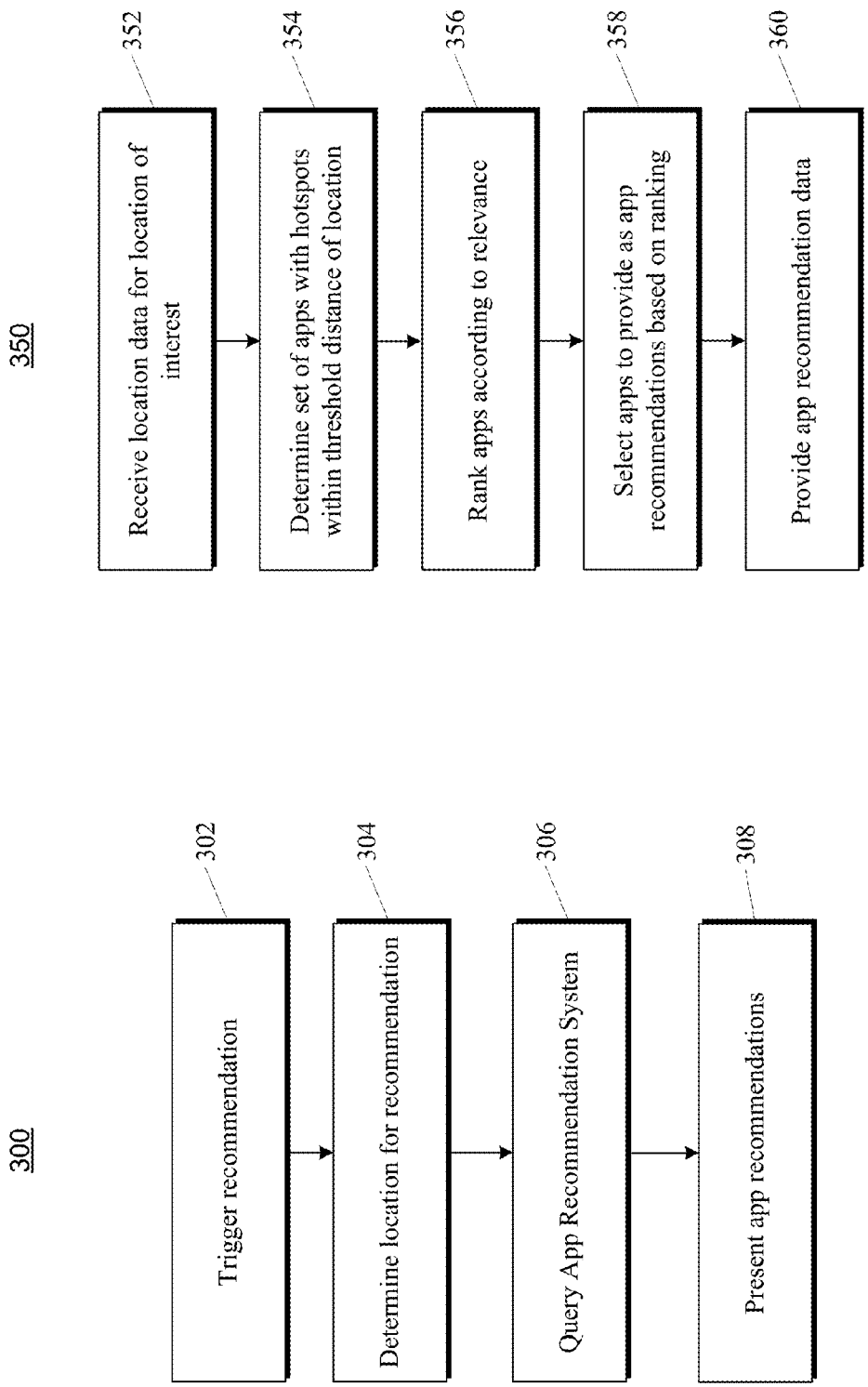
FIGS. 3A and 3B show high-level flow charts of processes for providing app recommendations in accordance with certain embodiments of the present invention.

FIG. 3A shows a flow chart illustrating a method 300 of obtaining locally relevant app recommendations at a mobile device (e.g., mobile device 101 or 240). At block 302, a recommendation is triggered. Triggering of a recommendation may occur in two general ways: (1) in response to a location trigger (e.g., an automatic user notification or alert); or (2) in response to a user input requesting localized apps (e.g., user request). A user trigger could be an overt action requesting local app recommendation or a less overt action by the user (e.g., going to Spotlight or Notification Center on an iOS device).

At block 304, a location for the recommendation is determined. In one embodiment, the location may be the current location of a mobile device (e.g., using GPS or other suitable location technology). In one embodiment, the location can be the last determined location to conserve battery. In one embodiment, the location may be a location other than the current location of a mobile device (e.g., a destination on a map, a location submitted in a search, location specified in a calendar entry, etc.).

At block 306, the app recommendation system is queried for a recommendation based on the location from block 304. For example, in FIG. 2, the app store system 230 may query the localized app recommendation system 220. In one embodiment, the user requests a list of one or more locally relevant apps. This may occur, for example, using the App Store user interface. An overt user request for a list of locally relevant apps will likely not happen very often, so downloading a list of relevant apps in response to the user request may use only minimal battery power and data bandwidth.

In other embodiments, it may be beneficial to notify users asynchronously of locally relevant apps while preserving battery power and reducing data usage. In one embodiment, localized app recommendations may be stored locally on the mobile device. In one embodiment, the locally relevant app recommendations may be asynchronously delivered to the device. In one embodiment, the locally stored relevant app recommendations are associated with a geographic location near and adjacent to the mobile device. Asynchronous delivery of local app recommendation is described in Section V, below.

At block 308, recommendations are presented to the user. The actual ranking may be generated device-side, using the data provided by the recommendation engine. In this way additional pieces of information known to the mobile device can be used for improving the relevance. For instance the language settings on the device, the current date, the origin/destination for routes, current weather, etc. This can be accomplished while still preserving privacy because, in certain embodiments, sensitive data is not sent to a server, rather sensitive data may be used device-side.

FIG. 3B shows a flow chart illustrating a method 350 of determining which apps to present in an app recommendation. This process can be performed by an app recommendation system on a mobile device (e.g., mobile device 101, 240, or the like) or an app recommendation system on a remote server computer (e.g., app recommendation server 220, app store system 230, or the like).

At block 352, the app recommendation system receives location data for the location of interest. The location of interest could be the current location of a mobile device or another location of interest. Locally relevant apps for the location of interest can be provided to the extent they exist.

At block 354, the app recommendation system determines a set of apps with hotspots within a threshold distance of the location of interest. The threshold distance may vary from app to app based on a number of factoring including how localized app usage is for that app at the location, the volume of app usage for that app at the location, and other app usage data and app metadata. For example, a first app might be highly localized to a particular building (e.g., an app for a specific museum), while a second app might be localized more generally to a city or neighborhood. The threshold distance for the first app may be less than the threshold distance for the second app.

At block 356, the app recommendation system can rank the apps according to relevance. The relevance ranking can include relevance as to location as well as relevance to other criteria (e.g., user profile, user interests, overall popularity, user reviews, app category, and the like). In some embodiments, the ranking is done using a relevance score. In some embodiments, the ranking is done by ordering/re-ordering the set of apps within hotspots within the threshold distance of the location of interest.

In some embodiments, the ranking can be generated device-side, using the data provided by the app recommendation system. In this way additional pieces of information can be used for improving the relevance (e.g., user data, user location history, etc.). For instance the language settings on the device, the current date, the origin/destination for routes, current weather, etc. In some embodiments, this can be incorporated while still preserving privacy, because sensitive data is not sent back to a remote server computer; rather more sensitive information is used inside the mobile device for presenting the user a more relevant ranking.

At block 358, the app recommendation system can select apps to be provided as recommended apps based on the ranking and/or relevance score calculated in the previous step. In some embodiments, a large number of locally relevant apps are returned (e.g., many apps have hotspots and are locally relevant for a particular location), in this instance, the app recommendation system may truncate the list of recommended apps such that only the most relevant apps with local hotspots are selected. For example, the top 5 or top 10 apps for a particular location could be selected.

At block 360, the app recommendation system may provide the app recommendation data. The app recommendation data can include an application identifier, a relevance score, hotspot locations for the app, and other information describing the app or its localized usage properties. The step of providing app recommendation data (block 360) can be in response to a query to the app recommendation system (e.g., block 306 in FIG. 3A). In some embodiments, if a user accepts a recommendation (e.g., by launching or downloading one of the recommended apps), feedback can be sent back to the app recommendation system. The data may be used for determining the efficacy of the recommendations provided and refining future recommendations.

III. User Discovery Mechanisms

As described above, app recommendations can be triggered based on the current location of a mobile device, i.e., location-triggered notifications or alerts with app recommendations, and/or user-triggered app recommendations, i.e., triggered by some user action other than the location of the mobile device. Location-triggered notifications or alerts with recommendations are described in more detail in subsection A, below. User-triggered app recommendations are described in subsection B, below.

A. Location-Triggered Notifications With Localized Recommendations

Figure 4:
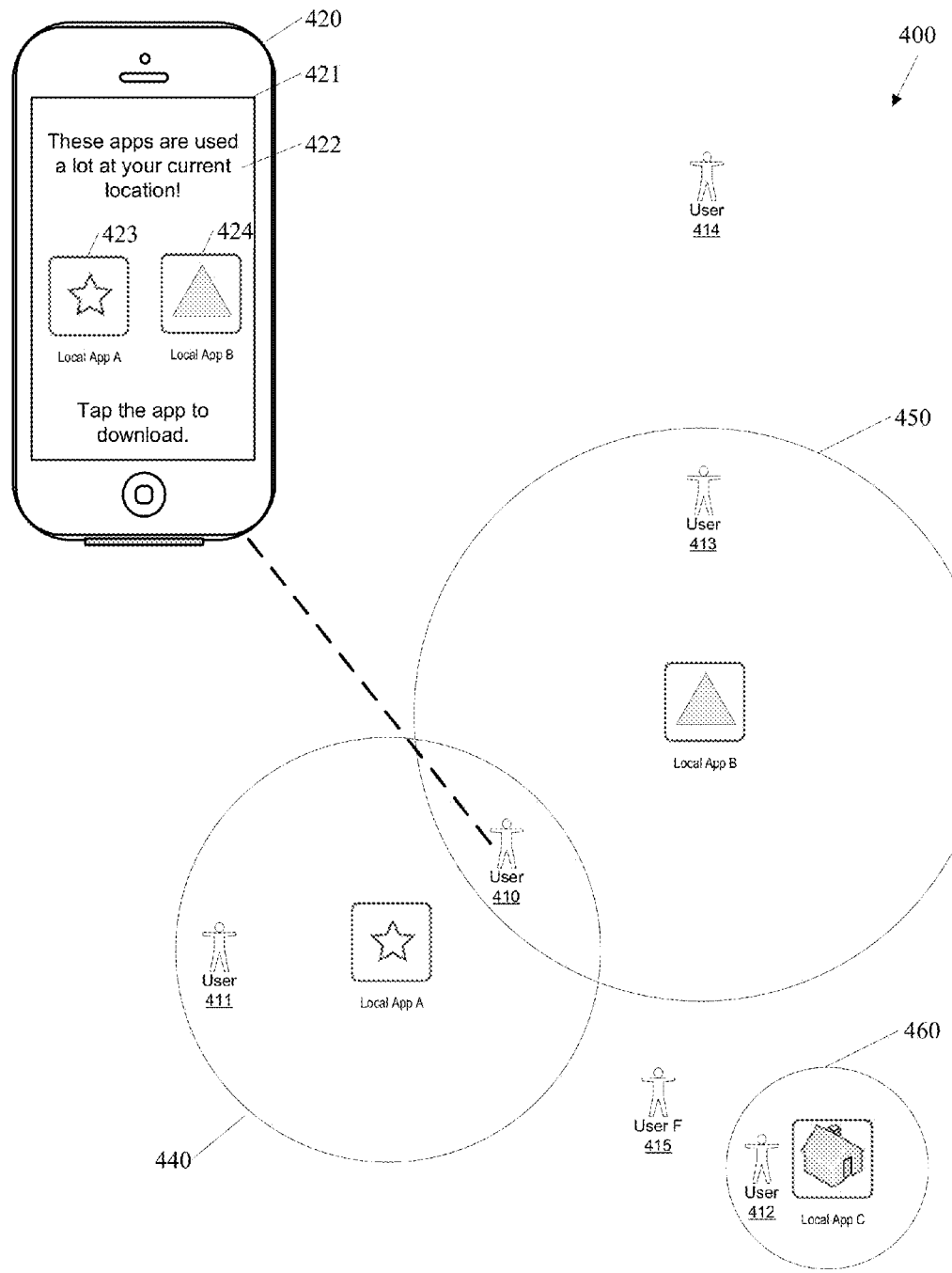
FIG. 4 shows a high-level block diagram of a system according to an embodiment of the present invention.

One of the mechanisms for local app discovery is notifications of relevant apps when the user arrives to an area with highly localized apps. Notifications can be provided for both apps that are already installed on the user's mobile device ("installed apps") and apps that are not installed on the user's mobile device ("uninstalled apps"). FIG. 4 illustrates a system 400 in accordance with an embodiment of the present invention. The scale of system 400 shown for illustration purposes only and one having skill in the art will recognize that any suitable scale can be used. For example, hotspots can be relatively small (e.g., building or city block sized) or relatively large (e.g., entire cities, counties, states, etc.)

System 400 includes a number of app usage hotspots 440, 450, and 460, which are hotspots for apps that exhibit a high degree of localization. Hotspot 440 is a hotspot for "Local App A," hotspot 450 is a hotspot for "Local App B," and hotspot 460 is a hotspot for "Local App C." The hotspots can vary in size. As illustrated, hotspot 450 is larger than hotspots 440 and 460. Hotspot 460 for Local App C is the smallest hotspot illustrated. By way of example, Local App C might be an app designed with the intention that it would be primarily and/or heavily used within a particular store (e.g., the Apple Store app is often used inside of an Apple retail store), whereas Local App B might be an app for discovering "things to do" in Union Square in San Francisco, Calif.

A number of users (410-415) are illustrated in various positions within system 400. Users 410-415 can each can have a mobile device (e.g., mobile device 101, 240, etc.) for providing app recommendations in accordance with embodiments of the invention. Only one of the mobile devices (420) is shown in FIG. 4, which corresponds to User 410's mobile device. Reference numerals 410-415 could also refer to the various positions of a single user at various times. Reference numerals 410-415 could also refer to locations of interest of a user other than the current location of the user (e.g., a search input, a map input, etc.).

User 410 is positioned within two areas identified as hotspot 440 for Local App A and hotpot 450 for Local App B. User 410 can be associated with mobile device 420. For example, user 410 could be carrying mobile device 420. A location module of mobile device 420 can determine the current location of mobile device 420. An app recommendation module on mobile device 420 (or in operative communication with mobile device 420) can determine whether the current location of mobile device 420 corresponds to one or more hotspots for particular apps. In some embodiments, the apps with hotspots may be already installed on mobile device 420. In some embodiments, the apps with hotspots may not be currently installed on mobile device 420. In this instance, the current location of mobile device 420 corresponds to hotspot areas for two apps (Local App A and Local App B).

In some embodiments, a notification can be provided on a display 421 of mobile device 420. Display 421 can include a user interface that displays any suitable information. A notification is illustrated on display 421. For example, the display could include information explaining the reason for the notification and/or relevance of the apps recommended in the notification (422). In some embodiments, a graphical element (e.g., an icon) corresponding to the identified app can be displayed (e.g., 423, 424, and the like). In some embodiments, apps identified as locally relevant (i.e., recommended apps) can be downloaded by selecting the graphical element (e.g., 423 or 424). In some embodiments, recommended apps can be launched by selecting the graphical element (e.g., 423 or 424).

User 410 is not within a hotspot 460 for Local App C. Therefore, in some embodiments, Local App C may be filtered out of the local app recommendations provided on mobile device 420. For example, Local App C may receive a low relevance ranking or the like. In some embodiments, user 410 could still receive a notification regarding Local App C on mobile device 420 since it is relatively near user 410. In some embodiments, the notification for an app such as Local App C may be provided with a lower ranking than more locally relevant apps, such as Local App A and Local App B.

User 411 is positioned within an area identified as hotspot 440 for Local App A. In some embodiments, a notification can be provided on a mobile device associated with user 411 with a recommendation for Local App A. Since user 411 is not within a hotspot for Local App B or Local App C, in some embodiments, those apps may be filtered out of the app recommendation and not provided in the notification. In some embodiments, Local App B and/or Local App C could be included in a notification since they are relatively close to the user 411. In some embodiments, the apps presented in the notification are based on a ranking or relevance score.

Users 412 and 413, like user 411, can receive a notification for Local App C and Local App B, respectively, since each respective user is located within areas identified as a hotspot for each respective app. In some embodiments, other apps may be filtered out based on the fact that they are not within a hotspot, not within a threshold distance of a hotspot, and/or otherwise have a relevance rank or score below a threshold.

User 414 is located in an area that is not associated with any hotspot for any application. In some embodiments, this can mean that no notification is provided to user 414. In some embodiments, a notification can be provided for apps with hotspots within a threshold distance of user 414. For example, a notification for Local App B may be provided since Local App B has a hotspot that is the closest to user 414 (as compared to the other illustrated hotspots).

Likewise, user 415 is located in an area that is not associated with any hotspot for any application. In some embodiments, this can mean that no notification is provided to user 415. In some embodiments, a notification can be provided for apps with hotspots within a threshold distance of user 415. For example, a notification for each of Local App A, Local App B, and Local App C can be provided since user 415 is substantially equidistant from the edges of each of the hotspots 440, 450, and 460.

Notifications can take any suitable form. Although visual notifications on display 421 were described, a notification could include audio, audio-visual, and/or physical forms. For example, an audio (e.g., "ding," ring tone, or the like) or voice prompt (e.g., SIRI) may notify the user of locally relevant app recommendations. In some embodiments, the prompt may be a vibration alert or an LED alert. One having skill in the art will recognize that other types of notifications are contemplated within the scope of the invention.

B. User-Triggered Localized Recommendations

Figure 5:
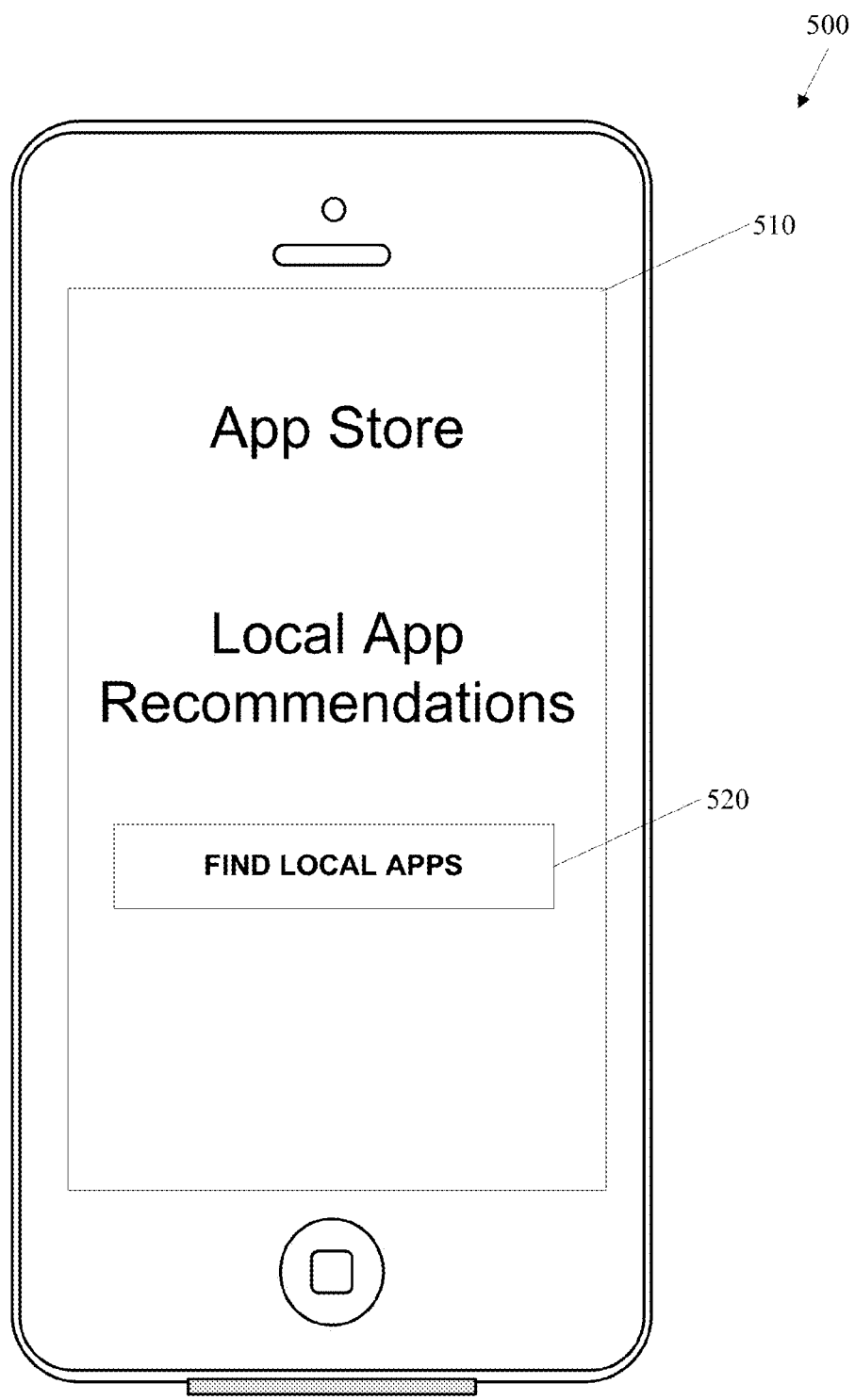
FIG. 5 shows a sample user interface for a user-triggered app recommendation according to an embodiment of the present invention.

FIG. 5 shows a sample mobile device 500 for user-triggered localized recommendations. A user-triggered app recommendation generally refers to triggering an app recommendation, based on a user action, that indicates that the user may be interested in receiving an app recommendation or in other scenarios where a user might find an app recommendation useful. One having skill in the art will realize that mobile device 500 is exemplary in nature and many other embodiments are possible.

Mobile device 500 includes a display 510 with a user interface. The user interface can include an option 520 (such as a soft key or other selection mechanism) for the user to overtly request apps that are relevant to a particular location. Responsive to a user actuating the option 520, mobile device 500 can present locally relevant app recommendation to the user.

In some embodiments, the location of interest can be the current location of mobile device 500. In this instance, mobile device 500 can determine its location responsive to the request for local app recommendations or it can look up a last known location stored on mobile device 500. Using the location information, a localized app recommendation can be provided. In some embodiments, a particular location can be a location other than the current location of mobile device 520.

In one embodiment, the user deleting an app can trigger an app recommendation. That is, when a user deletes an app, an alternative app may be presented. For example, if the deleted app is a highly localized app for a particular location, another app with high localization to that particular location may be suggested after the user deletes the app.

Users can also trigger localized recommendations in a less overt manner. In some embodiments, localized recommendations can be triggered when the user launches an app for downloading new apps (e.g., App Store). In some embodiments, a user search can trigger recommendations for localized apps. These searches can include web searching using engine search, or mobile device searches (e.g., searching the storage of a mobile device using a tool such as Spotlight). In some embodiments, localized recommendations can be triggered when the user accesses a notification area user interface (e.g., Notification Center). In some embodiments, localized recommendations can be triggered when the mobile device is in a screen-saver state or a lock-screen state (e.g., when a mobile device display changes from an off state to a lock-screen state or when a mobile device enters a screen saver state due to user inaction, etc.).

Other user actions (or inactions) that may trigger an app recommendation are described further in the following sections.

C. User Interface for Presenting Localized Recommendations

Once a recommendation has been triggered and localized apps have been identified, the app recommendation can be displayed to a user on a display of a mobile device. There are many options for providing the app recommendation to users so that user can discover locally relevant apps. Some of the mechanisms for app discovery are described in more detail below.

In some embodiments, localized apps can be visually distinguished from non-localized apps on a display. For example, visual cues can be presented for apps that are relevant at a location. Visual cues can include highlighting the app icon, animating the icon, adding a sash or badge to the app icon, changing the color/saturation/position/size/opacity of the app icon, or otherwise visually distinguishing locally relevant apps from other apps.

Figures 6A, 6B:
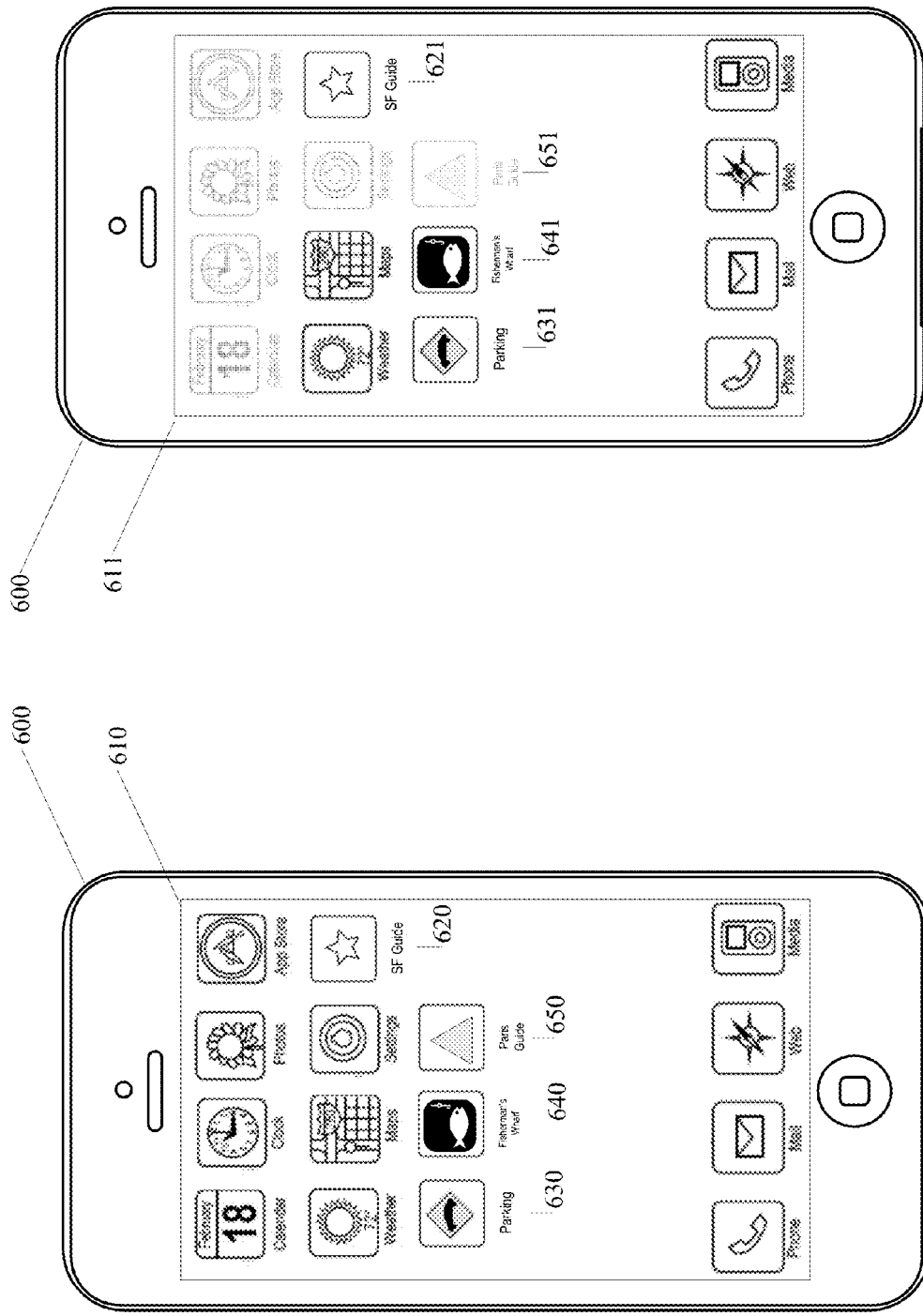
FIGS. 6A and 6B show sample user interfaces for visually distinguishing locally relevant applications according to an embodiment of the present invention.

FIGS. 6A and 6B show an example of visually distinguishing localized apps from non-localized apps on a display on a mobile device 600. FIG. 6A shows mobile device 600 with a user interface 610 displaying a number of apps that are available on mobile device 600. For example, icons for various apps can be provided, including calendar, clock, photos, application store, weather, maps, and settings apps. User interface 610 also includes an SF Guide app icon 620, a Parking app icon 630, a Fisherman's Wharf app icon 640, and a Paris Guide app icon 650. In FIG. 6A, all the app icons are shown in their regular, standard display mode without distinguishing visual characteristics indicating that the app is a localized app or not. This could be because mobile device 600 is in an area where there are not any localized apps or because an app recommendation has not been triggered.

FIG. 6B the same mobile device 600 with a modified user interface 611 after a recommendation has been triggered. User interface 611, like user interface 610, displays a number of apps that are available on mobile device 600. In contrast to user interface 610, user interface 611 visually distinguishes applications that are locally relevant to a particular location. For example the SF Guide app icon 621, Parking app icon 631, and Fisherman's Wharf app icon 641 are visually distinguished. In the embodiment shown, icons for apps that are not locally relevant are "greyed out." For example, the icons for Calendar, Clock, Photos, App Store, Settings, and Paris Guide 651 are "greyed out." In some embodiments, visually distinguished applications can still be launched or downloaded by selecting the application icon, while in other embodiments visually distinguished applications can be prevented from launching or downloaded.

For example, mobile device 600 may be located in San Francisco, Calif. when the app recommendation is triggered in FIG. 6B. Since the device is located in San Francisco, the SF Guide app may be locally relevant and therefore the icon for the app may be highlighted in user interface 611. Similarly, the Paris Guide app may be visually distinguished since it may not locally relevant to San Francisco. Other apps that exhibit high degrees of local usage may be highlighted, such as Weather, Maps, and Parking apps. For example, it may be that the Weather, Maps, Parking, and Fisherman's Wharf apps are used more frequently (with statistically significant localized use) in San Francisco by the user than, for example, the Clock app. Therefore, localized apps may be highlighted, while non-localized apps may be de-emphasized.

In some embodiments, an interactive visualization tool for local app discovery can be provided. In some embodiments, the interactive visualization tool for local app discovery is provided within an application store, such as the App Store. For example, a map of an area of interest may be displayed. The displayed map can be manipulated by zooming in and zooming out and changing the area of interest. Indications can be provided on the map where localized apps have been identified. In some embodiments, localized app recommendations may be provided through the interactive visualization tools for local app discovery. For example, based on a relevance ranking, user information, and/or other ranking information a localized app recommendation can be provided.

Figure 7B:
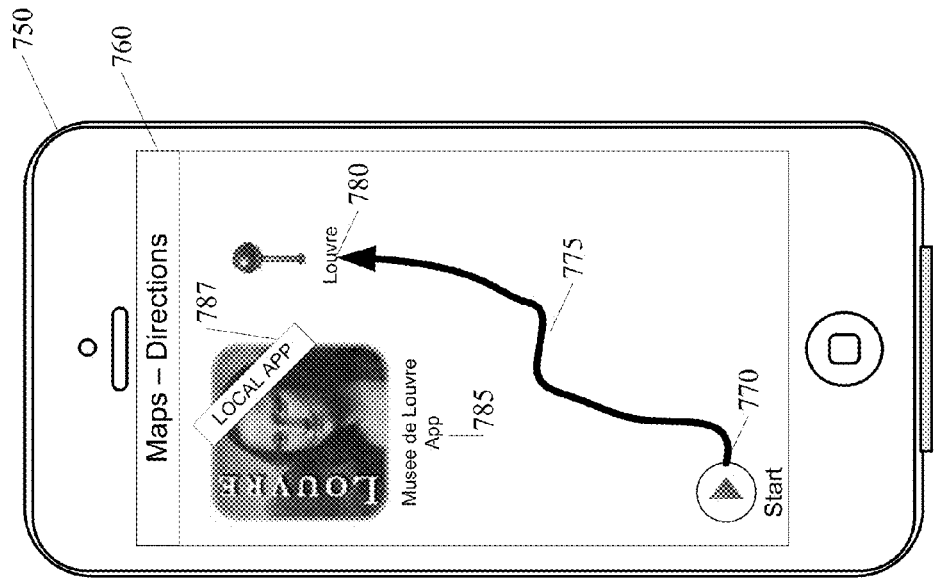
FIGS. 7A and 7B show sample user interfaces for integrating app recommendations into other applications according to an embodiment of the present invention.
Figure 7A:
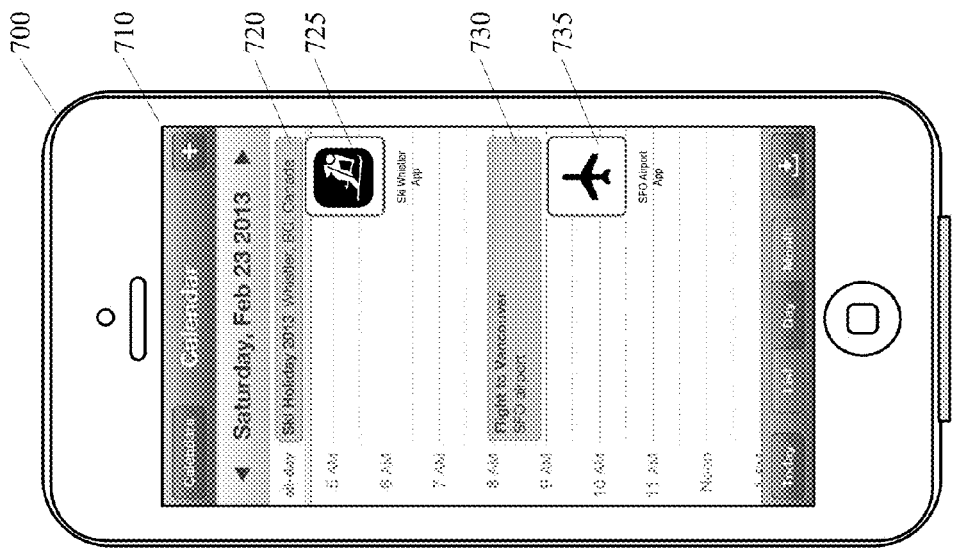

In some embodiments, localized app recommendation can be integrated into other applications running on the mobile device. For example, localized app recommendation can be integrated into map searches, route planning, web browser, calendar events, and the like. FIGS. 7A and 7B show two examples of such integration.

FIG. 7A shows an example of integrating app recommendations into a calendar app. Mobile device 700 includes a user interface 710 for a calendar application. User interface 710 can include one or more calendar entries (720 and 730). The calendar entries can have information associated with the calendar entries that describe the event (e.g., date, time, name, location, and the like). The calendar entries can be displayed in any suitable manner; user interface 710 is one example. Since calendar entries can have a location for the calendar event, localized app recommendations can be provided based on the location. For example, an application recommendation can be triggered and an app recommendation module (or calendar module) can extract calendar information, including an event location from a calendar app. The event location can be used as the location of interest for an app recommendation.

For example, in the example illustrated, there is a calendar entry 720 for a ski trip at a particular ski resort location. According to some embodiments of the present invention, the app recommendation module can determine whether there are any applications with usage hotspots at or near the ski location resort location. Other criteria can be applied to filter app recommendations, including the description of the event or activity, user profile information, and the like. In this instance, an application for the ski resort can be recommended to the user from within the calendar app user interface. In some embodiments, an icon 725 for the application can be displayed on the user interface 710. In some embodiments, actuating the icon 725 causes mobile device 700 to download and/or launch the application associated with icon 725 (here, the "Ski Whistler App").

In another example, there is a calendar entry 730 for a flight to Vancouver. According to some embodiments of the present invention, the app recommendation module can determine whether there are any applications with usage hotspots at or near San Francisco International Airport or Vancouver International Airport. In this instance, an application for the SFO Airport can be recommended to the user from within the calendar app user interface. In some embodiments, an icon 735 for the application can be displayed on the user interface 710 and actuating icon 725 may cause mobile device 700 to download and/or launch the application.

FIG. 7B shows an example of integrating app recommendations into mapping and route planning apps. Locations are often entered or otherwise selected using mapping apps through a user interface 760. For example, a start point 770 and an end point 780 can be specified. The mapping app can then determine a route 775 from start point 770 to end point 780. Location information from the mapping application, including location information for the starting point 770, route 775, and destination 780, can be used to provide locally relevant app recommendations to a user. In some embodiments, app recommendations with apps that are locally relevant to the destination can be provided on the user interface 760. In FIG. 7B, the destination is the Louvre Museum in Paris, France. In some embodiments, an icon 785 for a locally relevant recommended app can be displayed on the user interface 760 within the maps application. In some embodiments, a visual indicator, such as a sash (787) or badge, can indicate that the app is locally relevant. In some embodiments, the recommended app can be presented to the user by other notification mechanisms. In some embodiments, actuating the icon 785 causes mobile device 700 to download and/or launch the application (here, the "Musee de Louvre App"). Recommendations could also be provided for locations along the route 775 and/or the starting point of the route 770.

In some embodiments, localized app recommendation can be provided using audio. For example, the user could ask Siri for localized apps relevant to the user's current location or another location. In some embodiments, Siri can audibly respond by providing localized app recommendations. In some embodiments, Siri can request a user instruction to download and/or launch a localized app that was recommended by Siri. In some embodiments, the user instruction can be provided using voice commands.

In one embodiment, an "app suitcase" may be created for a user's trip. The app suitcase may be a suitcase icon (or a folder icon) on the user interface associated with a city or travel destination. The apps in the suitcase may be apps with a high degree of localization to the travel destination.

There are many other possibilities for user interfaces to provide localized app recommendations to users, including recommendations in notifications (e.g., Notification Center, pop-up notifications, banners, email notifications, text message or similar message notifications, and the like), screen savers, lock-screens, and the like. One having skill in the art will recognize that other possibilities exist.

IV. Example Use Cases

The following are example use cases according to some embodiments of the present invention.

Example One

A user is attending society of Interventional Radiology (SIR) 2012 Annual Scientific Meeting at Moscone Center in San Francisco, Calif. and has opt-in for localized recommendations using location. After a very long search for parking, he arrives to the Moscone Center, the location for the conference. While waiting in the line for registration, he receives a notification indicating there is a relevant local app for that location and date: "SIR 2012 Annual Scientific Meeting App." The user installs the app, and now he is able to check up-to-date information about the conference. The user checks what other location app recommendations are provided by the recommendation engine. The user sees that an app called "SFpark" is populated and used frequently at and around his location. Since the user had such a difficult time finding parking before the conference, the user decides to download the SFpark app. A local recommendation for the "Zagat" app is also provided as being locally relevant. The user decides to download Zagat as well to assist in finding a place to eat for lunch.

Example Two

A user is visiting Fisherman's wharf during her first trip to San Francisco, Calif. The following is a sample ranking she might see from the recommendation engine: (1) CityGuideDeals—San Francisco for Visitors and Locals; (2) Top 25 San Francisco Attractions Guide; (3) San Francisco Way; (4) San Francisco travel guide—tripwolf; (5) San Francisco Exploration Guide; and (6) San Francisco Guide—mTrip.

Example Three

A user is visiting the Times Square, Theater District in New York City. The following is a sample app ranking she might see from the recommendation engine: (1) Broadway and Theater—TheaterMania.com; (2) tkts; (3) New York; (4) New York City Essential Guide; (5) New York City Travel Guide—GuidePal; and (6) NYC Way.

Example Four

A user is planning her trip from New York to Paris. She decides that she will visit the Louvre. She searches maps for finding the route from the hotel she will be staying at. She gets the route and is also presented with an indication (visual cue) that there are locally relevant apps for the destination location. She taps into the corresponding affordance and she is presented with a highly relevant list of Apps for the Louvre. For example, the following is a sample app ranking she might see from the recommendation engine: Musée du Louvre; Monument Tracker PARIS; Paris Tourist Audio Guide; Paris Museums. In some embodiments, the list has been filtered by language (e.g., using the iOS language setting), so only apps in English (or the native language of the user) will show up. The user is also presented with the opportunity to bundle her apps for that trip and pack them into her "App Suitcase" (or other app container, such as a folder) for that trip. In some embodiments, additional discounts can be offered when the locally relevant apps are purchased together. In some embodiments, if the user chooses to buy "App Suitcase" for that trip, the apps will be downloaded while she is still at home (no roaming charges for data), and the apps will be ready to use when she arrives to in Paris.

Example Five

A user is traveling from Dijon to Paris (3 hours) and will be taking friends who are visiting Paris for the first time to the Louvre. He finds the route from home to the Louvre and he is presented with an indication that there are locally relevant apps for that location. However, he does not have time to buy and/or download the apps right at that moment. He arrives at the Louvre, and there is a very long line (e.g., more than one hour). While waiting in line he receives a notification of relevant local app: Musée du Louvre. He decides to check it out and install the app. Since the line is still moving slowly, he reviews the local app recommendations for Paris with his friends and decides to download additional apps. The following is a sample app ranking he might see from local app recommendation engine: Musée du Louvre; Paris Monument Tracker; Paris, Le Guide du routard; and Musées de Paris. Note the list shows only apps in French, his language setting (compare with example four).

Example Six

Months later, the same user from Example Five is back in the line for the Louvre with a different group of friends. While waiting in the line he remembers he has the Louvre App; he checks his phone and sees the Louvre App highlighted (or otherwise visually distinguished) because the app is locally relevant for where he is at that moment.

Example Seven

A user at a retail store wants to check Amazon reviews for a product. Currently if the user has a lot of installed apps that are not organized into folders, it might be difficult to find the right tool for the task at hand. As the number of installed apps grows, so does the time for finding the app the user wants to launch. Using locally relevant apps, the device shows the non-relevant apps greyed-out. This makes it easier to find the locally relevant installed apps for a particular location and time, in this case the Amazon app.

Example Eight

A user is waiting for a cable car on Powell street in San Francisco. While she waits, she browses locally relevant apps. The Apple Store app is locally relevant (likely because there is a retail store nearby on Stockton Street). The user was unaware that an Apple retail store was close. She downloads the Apple Store app and learns about EasyPay.

These examples are provided for illustration only and one having skill in the art will recognize that numerous additional applications of embodiments of the present invention.
V. Asynchronous Delivery and Caching of Localized Recommendations In one embodiment, localized app recommendations are delivered to the device using an asynchronous delivery mechanism. The "top" localized apps for the area surrounding the device may be delivered to the device. For example, app tiles containing identifiers for the top localized app and their corresponding hotspots may be pre-cached to the mobile device. The device caches the localized recommendations so that recommendations can be provided without querying a server with the user's location of interest. Asynchronous delivery and caching of recommendations minimizes battery-power consumption and cellular data usage. According to embodiments of the present invention, top localized apps for particular locations may be packed into manageable file sizes ("app tiles") for delivery and pre-caching to a device. In some embodiments, more or less information may be downloaded based on the device's data connection and/or power status. Although localized app recommendations are delivered asynchronously, recommendations are not necessarily provided to the user of the device immediately. Asynchronous delivery and pre-caching may provide the user with faster access to localized app recommendations because the device does not need to contact a server and download the information.

An example of an asynchronous delivery mechanism is as follows: A user walks into a Starbucks; therefore, the user might like the Starbucks app. Rather than querying the app store or app recommendation system with the current location of the device, which may occur often, local app recommendations are pre-cached to the device for areas near and adjacent to the location of the device. Pre-caching of local app recommendations for nearby areas provides a more efficient mechanism to deliver the relevant data to the device while minimizing data and battery usage.

In one embodiment of an asynchronous delivery mechanism, a server-side app recommendation system may package one or more bins into a binary tile packing format. The domain of interest is divided into a grid (or other partition). In one embodiment of the binary tile packing formatting, each tile may cover a 5 km×5 km square. Each tile may be subdivided into 10 m×10 m bins. The tiles may be divided into any suitable size, including 10 m×10 m bins, 100 m×100 m bins, 1000 m×1000 m bins or 5 km×5 km bins. One having skill in the art will recognize that other granularities may be used depending on the application.

For each bin, a list of hyper-local apps for that bin location may be maintained. An example, within each of the 10 m×10 m bins, is a list of top 3 apps that have been identified as super/hyper local. The top hyper-local apps for a particular bin may be maintained based on the hotspot analysis described herein. One having skill in the art will recognize that, while another suitable sized length of hyper-local apps may be maintained, it is beneficial for the asynchronously delivered content to not consume excessive bandwidth. The top hyper-local apps may be refreshed periodically to reflect localized apps that are seasonal in nature or subject to trends. In one embodiment, the top hyper-local apps may be refreshed every 2 or 3 days. One having skill in the art will recognize that other refresh rates are suitable.

The one or more binary tiles may be periodically delivered to the device and cached on the device for subsequent use. The number of binary tiles delivered to the device at a given time may vary based on the location of the device, available data connections, and/or power/charging status of the device.

Delivery of the binary tile(s) may vary based on the location of the device, available data connections, and/or power/charging status of the device. In one embodiment, if the device is using cellular data, a single tile that is associated with the current location is downloaded. This may reduce cellular data usage and associated expense to the user. In one embodiment, if the device is using WiFi, multiple tiles may be downloaded and cached to the device. For example, the tile associated with the current location and adjacent tiles associated with other nearby areas may be downloaded. This allows more information to be pre-cached while using a potentially faster and less costly data connection. In one embodiment, if the connection speed is faster (whether cellular or WiFi), more tiles are downloaded. In one embodiment, if a device is connected to external power, more tiles may be downloaded and cached to the device. For example, when operating on battery power, the device may download fewer tiles. When plugged into a power source, the device may download more tiles. When running low on battery power, the device may download fewer tiles.

Once the data is cached on the device, the device may use the cached localized app recommendations. In one embodiment, when a new location is obtained, the device checks the cached tiles, and specifically a bin associated with the current location, to determine whether there are any localized apps for the current location. In one embodiment, location is periodically obtained and the periodically obtained location is checked against the pre-cached tiles.

In one embodiment, a new tile is delivered to the device when there is no pre-cached tile containing a bin associated with the current location of the device. In one embodiment, new tiles are delivered when connected to power. In one embodiment, new tiles are delivered when connected to a WiFi network.

The asynchronous delivery of locally relevant content may be applied beyond localized app recommendations. Other types of information may be pre-cached and delivered for fast recall. In one embodiment, WiFi networks may be pre-cached. For example, a table of WiFi MAC addresses with location mapping may be maintained by a server. Tiles of preferred WiFi networks for given bins may be maintained. The tiles of preferred WiFi networks may be delivered to a device asynchronously. Other applications include: locally relevant music content, ads, books, movies, or other media.

In some embodiments, a method of asynchronous delivery of locally relevant content to a mobile device comprises: partitioning, by a server, a domain of interest into a plurality of bins associated with geographic locations; determining, with the server, locally relevant content recommendations for the plurality of bins using crowd-sourced app usage data; receiving, at the server, a request for locally relevant content recommendations from the mobile device, wherein the request comprises a location; packaging locally relevant content recommendations associated with one or more bins into a file package, wherein the one or more bins are associated with geographic locations near the location; and transmitting, by the server, the file package to the mobile device. In some embodiments, the locally relevant content recommendations include locally relevant app recommendations. In some embodiments, the file package has a file size that is variable, wherein the variable file size is dependent on a power status of the mobile device. In some embodiments, the file package file size is dependent on a network connection of the mobile device. In some embodiments, the file package file size is dependent on the location of the mobile device.

VI. Privacy

The present disclosure contemplates that privacy is important to users of mobile devices. Therefore, embodiments of the present invention take privacy considerations into account while providing relevant app recommendations. The goals of preserving user privacy and providing accurate, relevant app recommendations to users are aligned. For example, the value of crowd-sourced app usage data here materializes when there is sufficient data from many different users to show meaningful and statistically significant data (eliminating noise). In this context, a lone user's location and app usage—in isolation—is not helpful. Additionally, in certain embodiments, it is not necessary to have extremely precise location data. Accordingly, embodiments of the present invention contemplate privacy preserving rules.

As described above, one aspect of the present technology is the gathering and use of location data available from various sources to recommend apps that may be of interest to users. The present disclosure recognizes that the use of such location data in the present technology can be used to the benefit of users. For example, the location data can be used to better understand user behavior, and facilitate and measure the relevance of applications, advertisements and delivered content. Accordingly, use of such location data enables calculated control of the delivered content. For example, the system can reduce the number of times a user receives a recommendation for a particular application and can thereby select and deliver content that is more meaningful to users. Such changes in system behavior improve the user experience. Further, other uses for location data that benefit the user are also contemplated by the present disclosure.

The present disclosure further contemplates that the entities responsible for the collection, analysis, disclosure, transfer, storage, or other use of any location data should implement and consistently use privacy policies and practices that are generally recognized as meeting or exceeding industry or governmental requirements for maintaining location data private and secure. For example, location data should be collected for legitimate and reasonable uses of the entity and not shared or sold outside of those legitimate uses. Further, such collection should occur only after the informed consent of the users. Additionally, such entities would take any needed steps for safeguarding and securing access to such location data and ensuring that others with access to the location data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, location data. That is, the present disclosure contemplates that hardware and/or software elements can be provided to prevent or block access to such location data. For example, in the case of application recommendation services, the present technology can be configured to allow users to select to "opt in" or "opt out" of participation in the collection of location data during registration for services. In another example, users can select not to provide location information for application recommendation services. For example, devices of users that opt-in for localized app recommendation features will tag location data to app usage when privacy preserving rules (PPR) are met. Device-side, the localized App usage data may be anonymized and submitted to the app recommendation system for further processing. In another example, app developers may be provided with the capability to "opt in" or "opt out" of localized recommendations for particular apps that they develop. In yet another example, users can configure their devices or user terminals to prevent storage or use of cookies and other mechanisms from which location data can be discerned. The present disclosure also contemplates that other methods or technologies may exist for blocking access to their location data.

Therefore, although the present disclosure broadly covers use of location data to implement one or more various disclosed embodiments, the present disclosure also contemplates that the various embodiments can also be implemented without the need for accessing such location data. That is, the various embodiments of the present technology are not rendered inoperable due to the lack of all or a portion of such location data. For example, content can be selected and delivered to users by inferring preferences based on non-personal information data or a bare minimum amount of personal information, such as the content being requested by the device associated with a user, other non-personal information available to the content delivery services, or publically available information.

VII. Exemplary Server and Mobile Device Architecture

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. The various participants and elements described may operate or use one or more computer apparatuses to facilitate the functions described herein. Examples of such subsystems or components are shown in FIG. 8, which may illustrate parts of a computer apparatus.

Figure 8:
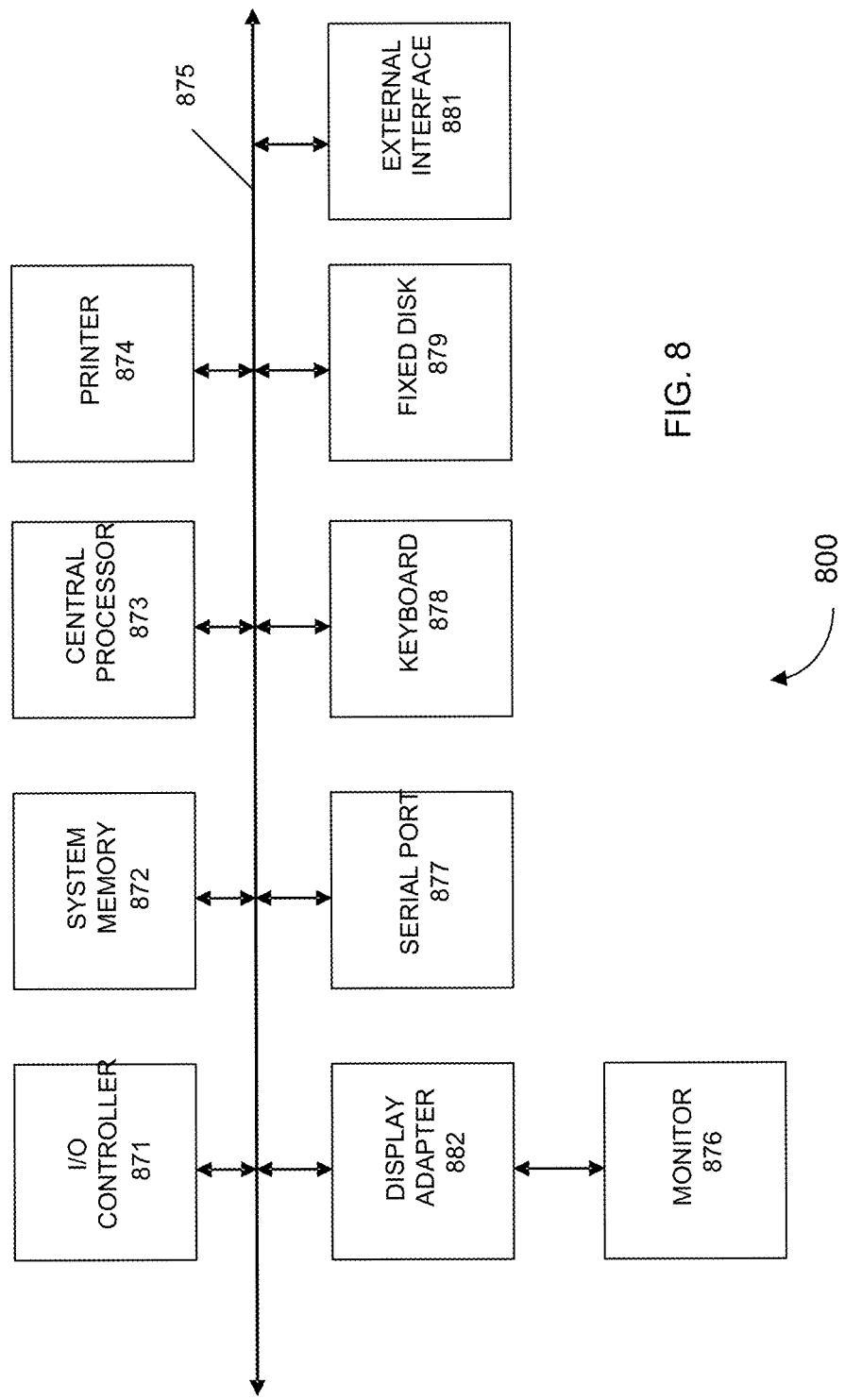
FIG. 8 shows an exemplary a computer apparatus that may be used in accordance with embodiments of the present invention.

The subsystems shown in FIG. 8 are interconnected via a system bus 875. Additional subsystems such as a printer 874, keyboard 878, fixed disk 879 (or other memory comprising computer-readable media), monitor 876, which is coupled to display adapter 882, and others are shown. Peripherals and input/output (I/O) devices, which couple to I/O controller 871, can be connected to the computer system by any number of means known in the art, such as serial port 877. For example, serial port 877 or external interface 881 can be used to connect the computer apparatus to a wide area network such as the Internet, a mouse input device, or a scanner. The interconnection via system bus allows the central processor 873 to communicate with each subsystem and to control the execution of instructions from system memory 872 or the fixed disk 879, as well as the exchange of information between subsystems. The system memory 872 and/or the fixed disk 879 may embody a computer-readable medium.

Any of the software components or functions described in this application, may be implemented as software code to be executed by a processor using any suitable computer language such as, for example, Java, C++ or Perl, using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

Figure 9:
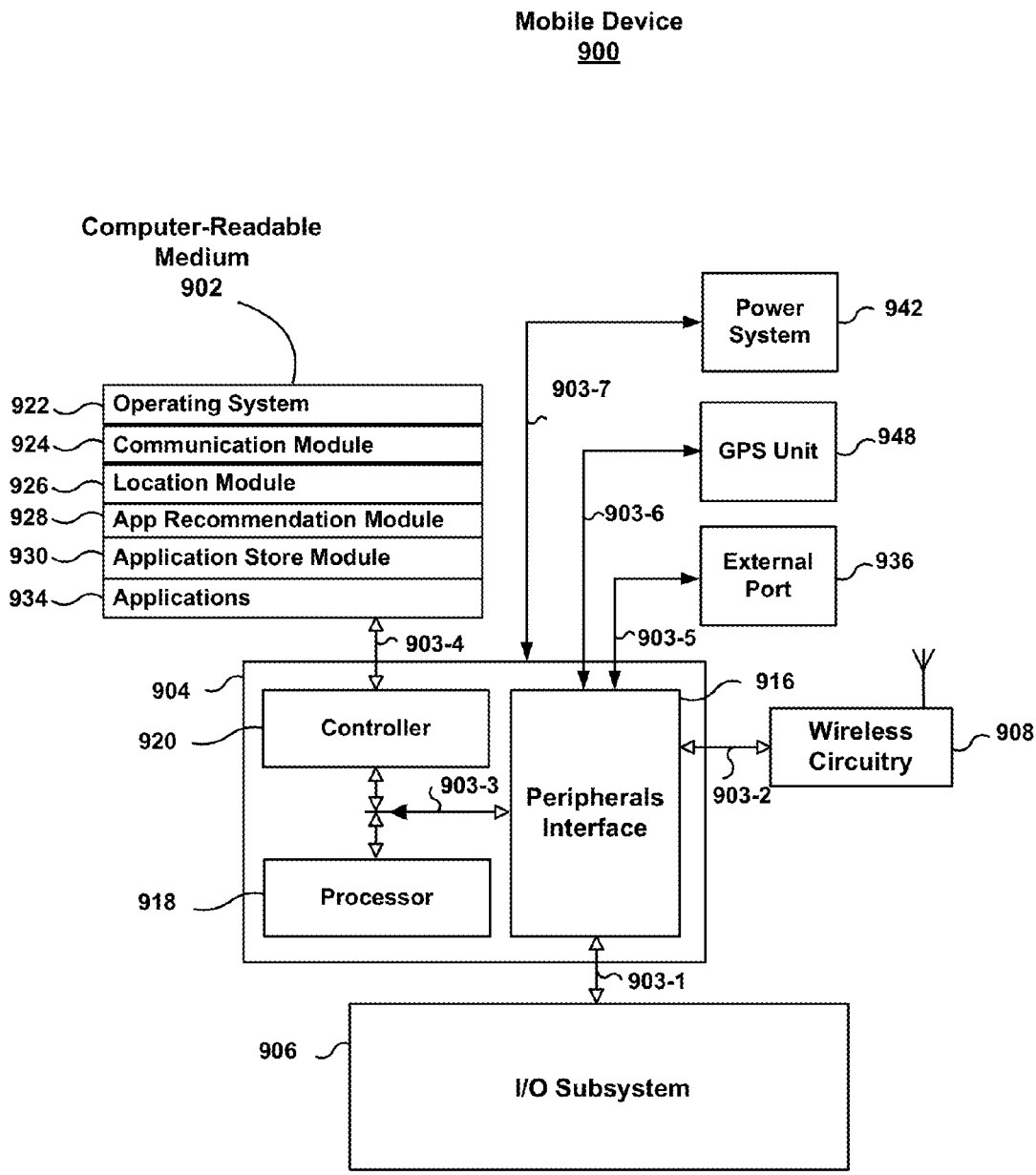
FIG. 9 shows an exemplary a mobile device that may be used in accordance with embodiments of the present invention.

FIG. 9 is a block diagram of a mobile device 900 according to an embodiment of the invention. In some embodiments, mobile device 900 can be a mobile device (e.g., 101 in FIG. 1). Mobile device 900 generally includes computer-readable medium 902, a processing system 904, an Input/Output (I/O) subsystem 906, and wireless circuitry 908. These components may be coupled by one or more communication buses or signal lines 903. Device 900 can be any portable electronic device, including a handheld computer, a tablet computer, a mobile phone, a laptop computer, a tablet device, a media player, a personal digital assistant (PDA), a portable GPS navigation unit, a built-in car navigation system, other car computer system, a key fob, a car key, an access card, a multi-function device, a mobile phone, a portable gaming device, or the like, including a combination of two or more of these items.

It should be apparent that the architecture shown in FIG. 9 is only one example of an architecture for mobile device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couples the input and output peripherals of the device to processor 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs)). In some embodiments, peripherals interface 916, one or more processors 918, and memory controller 920 can be implemented on a single chip, such as processing system 904. In some other embodiments, they can be implemented on separate chips.

Mobile device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power.

In some embodiments, mobile device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, an app recommendation module (or set of instructions) 928, an application store module (or set of instructions) 930, and other applications (or set of instructions) 934.

Operating system 922 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., USB, FireWire, Lightning connector, 30-pin connector, etc.) is adapted for coupling directly to other devices or indirectly over a network (e.g., the Internet, wireless LAN, etc.).

Location module 926 can assist in determining the current position (e.g., coordinates or other geographic location identifier) of mobile device 900. Modern positioning systems include satellite based positioning systems, such as Global Positioning System (GPS), cellular network positioning based on "cell IDs," and WiFi positioning technology based on a WiFi networks. Typically, GPS is the most accurate, but often consumes more power than the other positioning systems. GPS also relies on the visibility of multiple satellites to determine a position estimate, which may not be visible (or have weak signals) indoors or in "urban canyons." In some embodiments, location module 926 receives data from GPS unit 948 and analyzes the signals to determine the current position of the mobile device. In some embodiments, location module 926 can determine a current location using WiFi or cellular location technology. For example, the location of the mobile device can be estimated using knowledge of nearby cell sites and/or WiFi access points with knowledge also of their locations. Information identifying the WiFi or cellular transmitter is received at wireless circuitry 908 and is passed to location module 926. In some embodiments, the location module receives the one or more transmitter IDs. In some embodiments, a sequence of transmitter IDs can be compared with a reference database (e.g., Cell ID database, WiFi reference database) that maps or correlates the transmitter IDs to position coordinates of corresponding transmitters, and computes estimated position coordinates for mobile device 900 based at least in part on the position coordinates of the corresponding transmitters. Regardless of the specific location technology used, location module 926 receives information from which a location fix can be derived, interprets that information, and returns location information, such as geographic coordinates, latitude/longitude, or other location fix data.

App recommendation module (or set of instructions) 928 and application store module 930 can work together to a provide locally relevant app recommendation to a user of mobile device 900. In some embodiments, the app recommendation module and/or the application store module are in operative communication, through, e.g., wireless circuitry 908, with an app recommendation system (e.g., 220 or a similar a server computer).

The one or more applications 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

The I/O subsystem 906 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Although the above description focuses on providing locally relevant app recommendations, recommendations for other content, including music, books, movies, or other content available from iTunes®, may be provided using crowd-sourced data in accordance with certain embodiments of the present invention. For example, listening to a song or watching a movie may be tagged with location/time and the data anonymized and collected. The usage data can be analyzed to identify hotspots and recommendations based on hotspots may be provided without departing from the scope of the present invention.

Other extensions of the present disclosure are also contemplated. In one embodiment, frequently visited places of a user and mining of crowd-sourced localized app usage data may be used to provide a personalized recommendation of apps while preserving privacy considerations. In one embodiment, recommended places to visit may be presented to the users of mobile based on their frequently used apps and the mining of crowd-sourced localized app usage data while preserving privacy considerations. Using certain embodiments described above, it is possible to determine categories of apps that are localized. For example, categories of apps (e.g., travel apps, productivity apps, free apps, games, etc.) may be tagged with location data. This usage data may be analyzed by the app recommendation system. Categories of apps may then be recommended to a user based on location. In one embodiment, anonymized crowd-sourced data may be used in for advertising. For example, in iAds, the spatial distribution of the time users interacting with each iAd could be estimated. The distribution may be used for determining which iAds are presented at a given location and/or time. The distribution may be used for determining pricing.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of recommending one or more locally relevant applications, the method comprising:
    triggering, on a mobile device, a localized app recommendation process;
    determining, by the mobile device, a location of interest in response to the triggering of the localized app recommendation process;
    sending a query to a localized application ranking database that stores app hotspot data, wherein the query includes location data representing the location of interest, wherein the app hotspot data specifies one or more hotspots for each of a first plurality of applications, and wherein a hotspot of an application is determined based on usage of the application in an area corresponding to the hotspot;
    receiving, from the localized application ranking database, one or more relevant application recommendations that are relevant to the location of interest; and
    displaying the one or more relevant application recommendations.

2. The method of claim 1, wherein the triggering of the localized app recommendation process occurs when the mobile device comes within a predetermined radius of one of the hotspots of the app hotspot data.

3. The method of claim 1, wherein the triggering of the localized app recommendation process occurs in response to a user request from a user interface of the mobile device.

4. The method of claim 1, wherein the querying of the localized application ranking database occurs in response to a search input that specifies the location of interest.

5. The method of claim 1, wherein displaying of the one or more relevant applications includes a notification or an alert that is displayed on the mobile device.

6. The method of claim 1, wherein the localized application ranking database is stored locally on the mobile device.

7. The method of claim 6, wherein the localized application ranking database is pre-cached using an asynchronous delivery mechanism from a localized app recommendation server, wherein the localized application ranking database includes app hotspot data for predetermined areas proximate to the location of interest.

8. The method of claim 1, wherein the location of interest is a current location of the mobile device.

9. The method of claim 1, wherein the location of interest is a location other than a current location of the mobile device.

10. The method of claim 1 further comprising:
ranking the one or more relevant application recommendations based on a relevance score to the location of interest.

11. The method of claim 1, wherein the location of interest is determined by extracting the location data from data entries of a first application executing on the mobile device.

12. The method of claim 1, wherein a hotspot of an application is determined further based on the usage of the application in a plurality of other areas.

13. The method of claim 12, wherein the hotspot corresponds to an area within which usage of the application is more frequent than in the plurality of other areas.

14. The method of claim 1, wherein the usage of the application is by a plurality of users of a plurality of mobile devices.

15. The method of claim 1, wherein the usage of the application is measured by counting a number of uses of the application that each have a duration of at least a threshold duration.

16. The method of claim 15, wherein the number of uses are counted within a time period.

17. The method of claim 1, wherein the hotspot is determined when a value of the usage of the application measured in the area corresponding to the hotspot exceeds a threshold.

18. The method of claim 1, wherein displaying the one or more relevant application recommendations includes:
displaying, on a user interface of the mobile device, a plurality of graphical elements corresponding to a second plurality of applications;
determining, from the second plurality of applications, a first set of locally relevant applications corresponding to the one or more relevant application recommendations that are relevant to the location of interest;
determining, from the second plurality of applications, a second set of applications that are not relevant to the location of interest; and
visually distinguishing, on the user interface, graphical elements corresponding to the first set of locally relevant applications.

19. The method of claim 18, wherein visually distinguishing the graphical elements includes one or more of modifying a color, saturation, position, size, or opacity of the graphical elements.

20. The method of claim 18, wherein a first application is in the first set of locally relevant applications, the method further comprising:
launching the first application responsive to a user selection of a graphical element corresponding to the first application.

21. The method of claim 18, wherein a first application is in the first set of locally relevant applications, the method further comprising:
initiating a download of the first application responsive to a user selection of a graphical element corresponding to the first application.

22. A computer product comprising a non-transitory computer readable medium storing a plurality of instructions that when executed control a mobile device to of recommend one or more locally relevant applications, the instructions comprising:
triggering, on a mobile device, a localized app recommendation process;
determining, by the mobile device, a location of interest in response to the triggering of the localized app recommendation process;
sending a query to a localized application ranking database that stores app hotspot data, wherein the query includes location data representing the location of interest, wherein the app hotspot data specifies one or more hotspots for each of a first plurality of applications, and wherein a hotspot of an application is determined based on usage of the application in an area corresponding to the hotspot;
receiving, from the localized application ranking database, one or more relevant application recommendations that are relevant to the location of interest; and
displaying the one or more relevant application recommendations.

23. The computer product of claim 22, wherein the localized application ranking database is stored locally on the mobile device, wherein the localized application ranking database is pre-cached using an asynchronous delivery mechanism from a localized app recommendation server, and wherein the localized application ranking database includes app hotspot data for predetermined areas proximate to the location of interest.

24. The computer product of claim 22, wherein the querying of the localized application ranking database occurs in response to a search input that specifies the location of interest.

25. The computer product of claim 22, wherein displaying the one or more relevant application recommendations includes:
displaying, on a user interface of the mobile device, a plurality of graphical elements corresponding to a second plurality of applications;
determining, from the second plurality of applications, a first set of locally relevant applications corresponding to the one or more relevant application recommendations that are locally relevant to the location of interest;
determining, from the second plurality of applications, a second set of applications that are not locally relevant to the location of interest; and
visually distinguishing, on the user interface, graphical elements corresponding to the first set of locally relevant applications.

26. The computer product of claim 22, wherein the location of interest is determined by extracting the location data from data entries of a first application executing on the mobile device.

27. A mobile device for recommending one or more locally relevant applications, the mobile device comprising:
one or more provides configured to:
trigger a localized app recommendation process;
determine a location of interest in response to the triggering of the localized app recommendation process;
send a query to a localized application ranking database that stores app hotspot data, wherein the query includes location data representing the location of interest, wherein the app hotspot data specifies one or more hotspots for each of a first plurality of applications, and wherein a hotspot of an application is determined based on usage of the application in an area corresponding to the hotspot;
receive, from the localized application ranking database, one or more relevant application recommendations that are relevant to the location of interest; and
display the one or more relevant application recommendations.

* * * * *

UNITED STATES PATENT AND TRADEMARK OFFICE
CERTIFICATE OF CORRECTION

| | | |
|---|---|---|
| PATENT NO. | : 9,195,721 B2 | Page 1 of 1 |
| APPLICATION NO. | : 13/843291 | |
| DATED | : November 24, 2015 | |
| INVENTOR(S) | : Soto Matamala et al. | |

It is certified that error appears in the above-identified patent and that said Letters Patent is hereby corrected as shown below:

In the claims,

Column 26, Line 3, Claim 22: please delete "device to of recommend" and insert -- device to recommend --.

Column 26, Line 58, Claim 27: please delete the word "provides" and insert the word --processors--.

Signed and Sealed this
Twenty-ninth Day of March, 2016

Michelle K. Lee
*Director of the United States Patent and Trademark Office*